May 28, 1963
A. MARZOCCHI ET AL
3,091,561
METALIZED FLATTENED GLASS STRAND AND METHOD OF MANUFACTURING
Filed Sept. 11, 1957
4 Sheets-Sheet 1
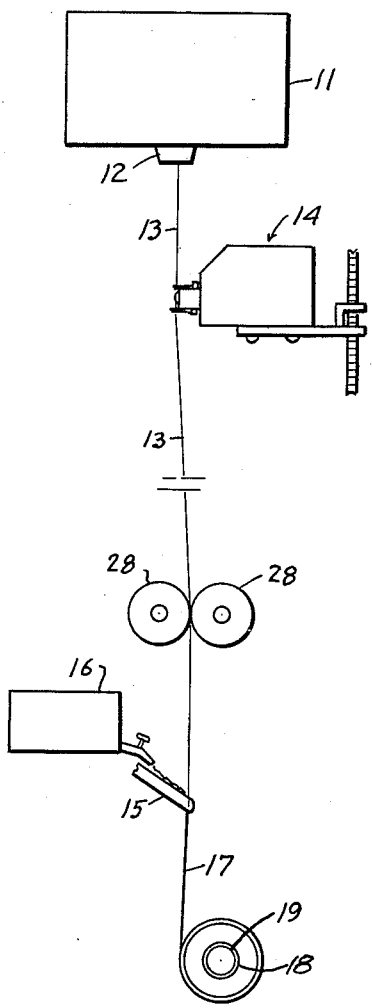
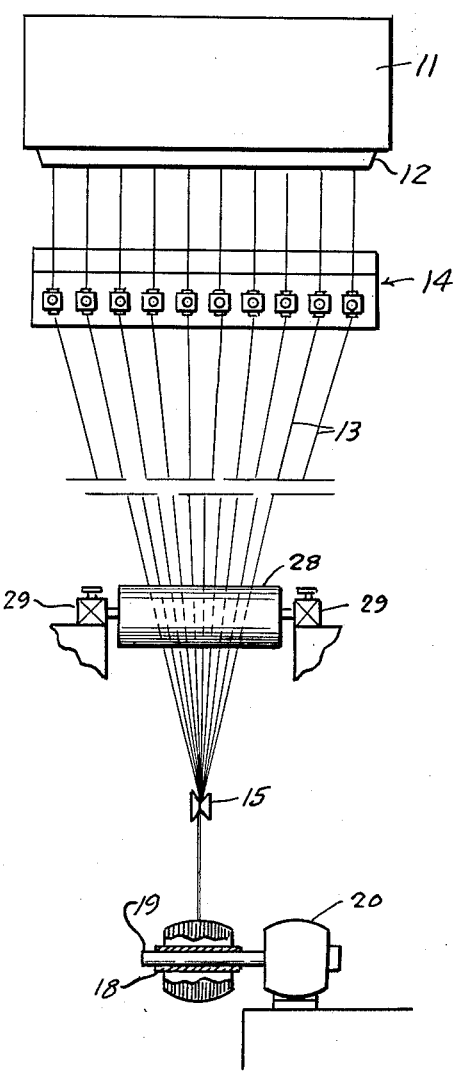
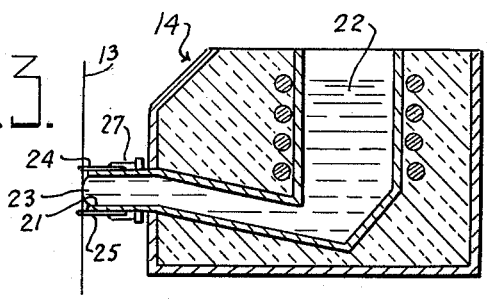
INVENTORS.
Alfred Marzocchi
S. Martin Billett
BY
Staelin & Overman
ATTORNEYS May 28, 1963  A. MARZOCCHI ET AL  3,091,561
METALIZED FLATTENED GLASS STRAND
AND METHOD OF MANUFACTURING
Filed Sept. 11, 1957  4 Sheets-Sheet 2
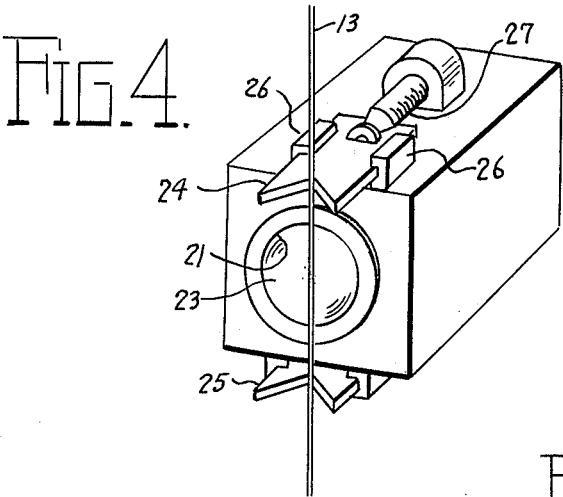
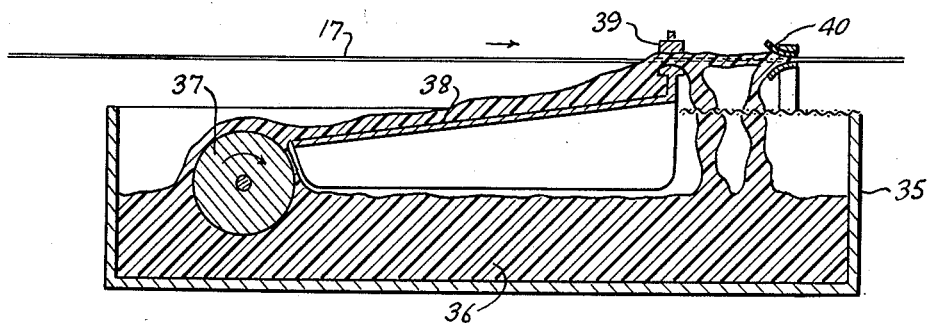
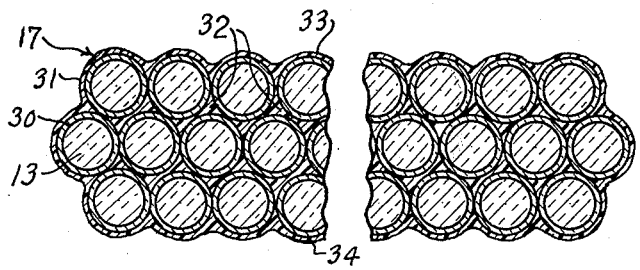
INVENTOR.S
Alfred Marzocchi
BY S. Martin Billett
Staelin & Overman
ATTORNEYS May 28, 1963

A. MARZOCCHI ET AL 3,091,561

METALIZED FLATTENED GLASS STRAND
AND METHOD OF MANUFACTURING

Filed Sept. 11, 1957

INVENTORS
Alfred Marzocchi
S. Martin Billett
BY
Staelin & Overman
ATTORNEYS

May 28, 1963
A. MARZOCCHI ET AL
3,091,561
METALIZED FLATTENED GLASS STRAND
AND METHOD OF MANUFACTURING
Filed Sept. 11, 1957
4 Sheets-Sheet 4
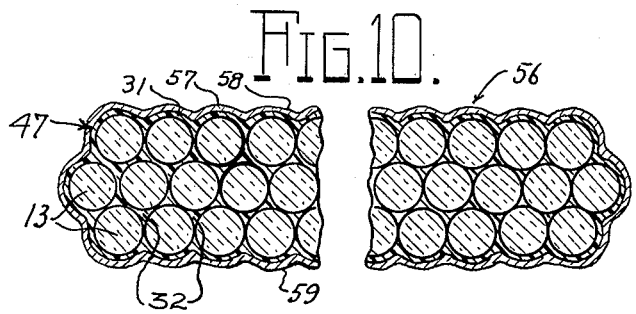
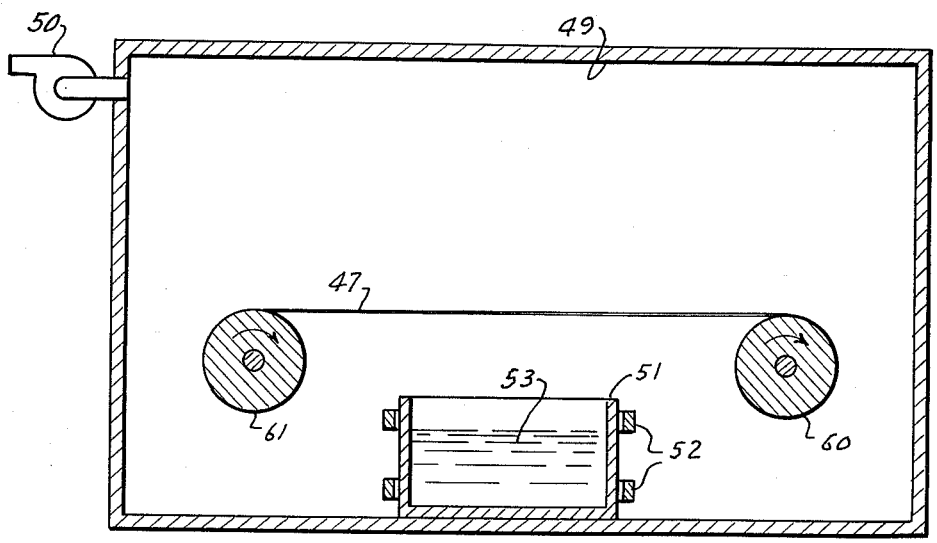
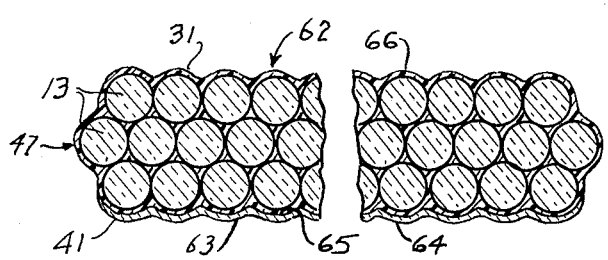
INVENTORS
Alfred Marzocchi
S. Martin Billett
BY
Staelin & Overman
ATTORNEYS ![United States Patent Office logo] 3,091,561
Patented May 28, 1963

3,091,561
METALIZED FLATTENED GLASS STRAND AND
METHOD OF MANUFACTURING
Alfred Marzocchi, Manville, and S Martin Billett, Esmond, R.I., assignors to Owens-Corning Fiberglas Corporation, a corporation of Delaware
Filed Sept. 11, 1957, Ser. No. 683,358
3 Claims. (Cl. 154—53.6)

This invention relates to metal coated glass strands and more particularly to flattened glass strands at least partially coated with metal which have a higher luster than ordinary metal coated glass strands because of their flattened cross sections. Strands embodying the invention are particularly useful in decorative fabrics because of their high luster. Such strands also are suitable for industrial uses, for example, cable sheathing and conductors, and other uses where the light weight and strength of the glass fibers contribute to the utility of the electro-conducting metal coating.

Metal coated glass fibers are known in the art and have been heretofore produced by methods such as gas plating, vapor deposition, and chemical deposition. Such metal coated glass fibers, however, are of conventional, circular cross section and are completely coated with metal. Although suited for some uses, these fibers have not had sufficient brilliancy to be effectively used for decorative textile fabrics. The fibers and strands made from such fibers are circular in cross section and, therefore, present convex outer surfaces. Such surfaces disperse reflected light in diverging rays which causes the luster or brilliancy of the strands to be diminished. Further, the circular cross-sectional shapes of such strands present a minimum area for intercepting and reflecting light rays.

Metallic threads with flattened cross sections in the form of narrow plastic ribbons have recently been developed and are frequently utilized in fabrics for decorative effects. These ribbons are produced by sandwiching metal foil or a metalized plastic sheet between two sheets of transparent plastic and subsequently slitting the laminated sheets into narrow ribbons. While the flat metal-plastic interface produces a bright appearance, these strands are very weak. The weakness makes the metallic plastic threads difficult to weave and limits their possible uses.

The metal coated strand of the present invention achieves high tensile strength by using glass fibers as a base for a metal coating. The high tensile strength enables the metal coated glass strands to be woven into fabrics with less frequent breaking which results in higher production and lower production costs. The high tensile strength of the glass fibers also helps the metallic strands to resist being broken when snagged. This is a prime advantage over decorative textile elements or strands heretofore known. Further, the high tensile strength enables the metallic strands to be employed in use where high strength is required and for which metal-plastic strands are, therefore, totally unsuited.

The present invention is concerned with metal coated glass strands of flattened cross section. Metal coated glass strands made according to the invention attain a higher brilliancy and enhanced luster because of their flattened cross-sectional shape, than is attainable with strands of circular cross section. The flat shape has substantially planar major surfaces which are more reflective than the convex outer surfaces of metal coated fibers of circular cross section or of strands of circular cross section previously known in the art. The shape of the flattened strands also presents a larger area with which light rays can be intercepted and reflected.

The flattened cross-sectional shapes of the metal coated strands of the present invention, combined with the high tensile strength of the glass fiber strands, enable the strands to be suited for specialized uses, such as cable sheathing and conductors.

It is, therefore, the principal object of the present invention to provide a metallic glass fiber strand that has improved reflectivity and greater luster.

It is another object of this invention to provide a decorative metallic strand which has a flattened cross-sectional shape giving the strand greater light reflectivity and higher luster.

It is a further object of this invention to provide a metallic strand which has a flattened cross-sectional shape which, in combination with the high tensile strength of the strand, enables the strand to be peculiarly adopted for specialized uses.

Other objects of the invention will be better understood from the following detailed description thereof, reference being made to the accompanying drawings, in which:

FIG. 1 is a fragmentary side view, in elevation, of apparatus for applying a continuous metal coating around at least portions of peripheries of glass filaments as they are attenuated, and for forming the coated filaments into a flattened strand;

FIG. 2 is a fragmentary front view, in elevation, of the apparatus shown in FIG. 1;

FIG. 3 is a vertical sectional view of a metal applicator used in the apparatus illustrated in FIGS. 1 and 2, for forming a globule of molten metal in which the filaments are at least partially immersed;

FIG. 4 is a view in perspective of a portion of the metal applicator shown in FIG. 3 and showing adjustable guides for varying the extent of immersion of the filaments in the metal globule;

FIG. 5 is a schematic view of apparatus for applying a continuous and complete protective plastic coating to strands made by the operation of the apparatus of FIGS. 1–4;

FIG. 6 is a greatly enlarged, fragmentary view in cross section of a strand made by operation of the apparatus shown in FIGS. 1–4;

FIG. 10 is a greatly enlarged, fragmentary view in cross section of a strand made by a modified operation of the apparatus of FIGS. 1–4 and by the operation of the apparatus shown in FIG. 9;

Figure 7:
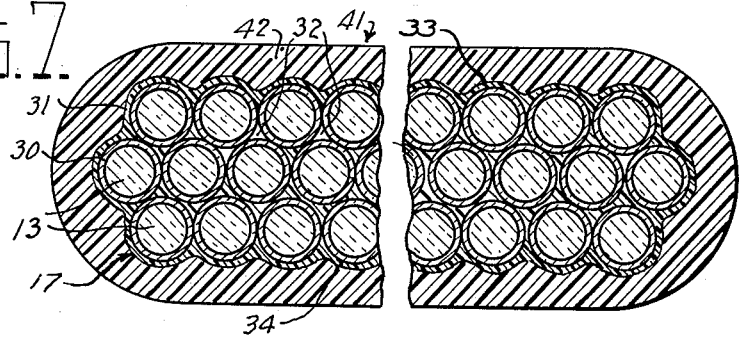
FIG. 7 is a greatly enlarged, fragmentary view in cross section of a modified form of the strand shown in FIG. 6 and made by operation of the apparatus shown in FIGS. 1–5.

FIG. 11 is a simplified view in cross section of apparatus for applying a continuous metal coating to only a portion of the outer surface of a flattened, glass strand made by a modified operation of the apparatus shown in FIGS. 1–4; and FIG. 12 is a greatly enlarged, fragmentary view in cross section of a strand made by a modified operation of the apparatus shown in FIGS. 1–4 and by the operation of the apparatus shown in FIG. 11.

A metal coating may be applied in accordance with the invention to a flattened glass strand in any of several suitable ways. One satisfactory apparatus for applying the coating is shown in FIGS. 1–4 in which glass filaments are individually metal coated before they are formed into a flattened strand. Referring partcularly to FIGS. 1 and 2, a glass melting tank 11 has a plurality of minute orifices (not shown) located in the bottom of a bushing 12. The orifices are preferably arranged in one or two rows so as to be in substantially the same vertical plane. Continuous glass filaments 13 attenuated from molten glass streams flowing through the orifices, are led past a metal applicator 14, if desired, and over a gathering shoe 15 which applies a high integrity binder onto the filament 13 from a container 16. The gathering shoe 15 also collects the filaments into an untwisted strand 17 which is wound onto a tubular sleeve 18 removably mounted on a collet 19 that is driven at high speed by a motor 20 to package the strand 17 and provide tension for attenuating the filaments 13, pulling them over the metal applicator 14, and flattening the strand 17, as will be described.

When the sleeve 18 is full, it is replaced with an empty sleeve. The strand 17 on the full sleeve 18 is then dried to set up the binder on the strand 17 to retain the strand 17 on a permanent, flattened shape. The filled sleeve 18, with the strand 17, can be placed in a heat-treating oven for a sufficient length of time at a suitable temperature to harden the binder. The strand 17 also can be unwound from the sleeve 18, when the binder is sufficiently dry to hold the shape of the strand 17, and led through a heat-treating oven in a continuous technique to complete the drying. The strand 17 can be subsequently led through suitable apparatus for the application of a protective coating of a suitable plastic which can be clear or colored to give a color tone to the strand.

The metal applicator 14, which can partially or fully coat the filaments 13 with a continuous, thin layer of metal, is the type disclosed in Whitehurst and Otto patent, No. 2,772,518. Referring particularly to FIGS. 3 and 4, the metal applicator 14 has a plurality of individual spouts 21 from which molten metal from a heated crucible 22 protrudes to form globules 23. The filaments 13 are led through the globules 23 by rotation of the sleeve 18 and the collet 19 and are guided by guides 24 and 25. The guides 24 and 25 are slidably held in ways 26 and can be longitudinally adjusted by means of threaded shanks 27. The adjustable feature of the guides 24 and 25 controls the degree to which the filaments 13 are immersed in the globules 23 and, hence, the extent to which the outer surfaces of the filaments 13 are coated.

The binder applied to the filaments 13 in a layer or droplets by the gathering shoe 15 from the container 16 is preferably of a high integrity type such as is disclosed in Marzocchi et al. application, S.N. 661,027, filed May 23, 1957, now U.S. Patent No. 2,958,114. This binder can comprise, for example, 3.0% by weight oil modified alkyd resin, 2.0% by weight unpolymerized epoxy resin, 1.5% by weight stearato chromic chloride, 1.0% by weight gelatin, 0.15% by weight surface active agent, as aryl alkyl polyether alcohol, and 92.80% by weight water. The strand 17, with the high integrity binder, is wound onto the sleeve 18 a fraction of a second after the binder is applied. The strand is wound onto the sleeve 18 before the binder hardens by properly selecting the type and amount of the binder and the distance between the gathering shoe 15 and the sleeve 18, or a layer of strand 17 previously wound thereon. Because of the tension exerted on the strand 17 by the pulling force of the sleeve 18, the strand 17 is formed on the sleeve 18 with a flattened cross section. Such a flattened strand has a width of some 15 to as many as, say, 40 times its thickness.

The amount of the binder, by weight, should not exceed approximately 3 to 6% of the weight of the filaments 13, and should be preferably about 1 to 2%. With this amount of binder, the filaments 13 are bonded together securely to form the flattened strand 17. If the amount of binder is more than approximately 3 to 6%, however, there is a danger that superimposed turns of the strands 17 will be cemented together on the sleeve 18. On the other hand, if the amount of the binder is lower than about 1%, the filaments 13 will not properly adhere to one another in the flattened strand 17.

The strand 17 contains from 200 to 400 individual filaments. When the strand 17 is flattened to the degree stated, it is only a few filaments in thickness, say from 3 to 6, and from approximately 60 to 90 filaments in width. If the strand is wider than this, it will not have sufficient thickness to be an integral product. On the other hand, the narrower the strand is, the less effective it is from the standpoint of reflectivity.

The width and thickness of the strand can be controlled to some extent by the amount of tension on the strand 17. The tension can be controlled by the speed of the sleeve 18 and the collet 19; however, a change in speed also affects the diameters of the filaments 13. If the speed is increased, the tension on the filaments 13 is increased, other factors remaining equal, and the filaments 13 will be drawn from the molten glass flowing through the orifices at a more rapid rate, thus causing the filaments 13 to be drawn to finer diameters. It is preferably to engage the filaments 13 with friction rollers 28 at a point above the gathering shoe 15. The rollers 28 are journaled in bearings 29 whose drag is preferably adjustable. By increasing the drag on the rollers 28, greater resistance is applied to the filaments 13. More power is then applied to the collet 19 and the sleeve 18 to maintain a constant speed of the filaments 13 and uniform diameters thereof. The filaments 13 and the strand 17, below the rollers 28, are thereby placed under greater tension and are flattened to a greater degree on the sleeve 18. Less drag on the rollers 28 results in less tension in the strand 17 and the strand 17, as wound on the sleeve 18, is thicker and narrower.

FIG. 6 shows a greatly enlarged, fragmentary view in cross section of the strand 17 coated by the operation of the apparatus of FIGS. 1–4. FIG. 6 and the following figures showing enlarged, cross-sectional views of strands coated according to the invention are intended to serve in an illustrative and not a limiting sense. No attempt has been made to show correct relative sizes between the filaments and the strands, the filaments and coatings, the coatings, or the width and thickness of the strands. Although all of the filaments of a strand will be of substantially uniform diameter throughout its length, the diameters of the filaments in separate strands can vary greatly according to the status of many variables in their manufacture. These variables can be controlled to produce filaments of vastly different diameters.

The strand 17 shown in FIG. 6 has a thickness equal to approximately 3 to 6 of the filaments 13 and a width equal to approximately 60 to 90 of the filaments 13, only a small portion of which are shown. Each of the filaments 13 has a thin metal coating 30 as applied by the metal applicator 14. A binder coating 31 which can be in the form of discontinuous droplets instead of a layer, as shown, is applied by the gathering shoe 15 from the container 16 over the metal coated filaments 13 and extends into at least some of the interstices 32 between the filaments 13, thus maintaining the strand 17 in a flattened shape. The strand 17 has two major reflective surfaces 33 and 34 formed by the outer portions of the contiguous metal coatings 30 on the outer filaments 13. The surfaces 33 and 34 present large areas which intercept and reflect light rays in a manner similar to that of a mirror.

The strand 17 is well suited for use in decorative textiles because of the higher luster obtained with the major surfaces 33 and 34 of the flattened cross section and is also suited for conductors and for protective, braided sheathing for cables.

The strand 17 can be covered with a thick, light transmissive, plastic coating, if desired. Whether or not this is done depends on several considerations. If the metal in the metallic layer 30 is non-tarnishing and if it has been deposited by a method which insures adequate adhesion to the exterior of the individual filaments 13, it is not necessary to apply an exterior or protective coating of plastic. On the other hand if the metal used is a tarnishing metal such as silver, lead or other, or if the metal applied is subject to damage by cleaning or washing methods, or if it is not adequately adhered to the individual filaments, then a subsequent plastic layer which forms a protective sheathing over the exterior of the metal layer probably is advisable. In any case, the application of a thick, light transmissive, plastic coating to the metal coated strand 17 tends to enhance its luster. Further, the plastic coating can be clear or can be tinted to impart a different appearance to the metallic coating. As an example, for a metal coating having a silver color, as aluminum, the plastic coating can be tinted an amber color to create an overall gold appearance or be tinted various shades of blue or green to create an appearance of anodized aluminum.

A heavy plastic coating can be applied over the strand 17 by the apparatus shown in FIG. 5, after the binder is set-up or hardened to bond the filaments 13 permanently in the flattened strand 17. A tank 34 contains a pool 36 of a solution, suspension, or "plastisol" of a suitable plastic, such as a vinyl or a cellulose acetate butyrate. A feeding drum 37 is partially immersed in the pool 36 and picks up the plastic and feeds it up a slightly inclined plate 38 as the drum is rotated in a clock-wise direction by a motor (not shown). The plastic is fed up the plate 38 faster than the plastic is used so that it piles up at the upper end of the plate 38 and overflows through a wiper 39. The flattened strand 17 is led through the plastic mass at the upper end of the plate 38 and through the wiper 39 which removes excess plastic from the strand 17 and distributes the remaining plastic onto the metal coating 30. The strand 17 is then led through a die 40 which forces air out of the plastic liquid, presses it tightly on the metal coating 30, and smooths the surface of the plastic on the strand 17. A circular orifice can be employed in the die 40 as is disclosed in Horton et al. application, S.N. 415,584, filed March 11, 1954, now Patent No. 2,867,891, since the srand 17 in passing through such an orifice is not permanently deformed from its flattened shape. However, the die 40 can be made with a flat or oval orifice to aid in maintaining the desired cross-sectional form of the coated strand 17. The strand 17 is subsequently led through a suitable heat-treating furnace to dry the plastic coating.

FIG. 7 shows a strand 41 which is otherwise the same as the strand 17 shown in FIG. 6 except for a thick plastic coating 42 applied by the apparatus of FIG. 5. This coating 42 tends to enhance the luster of the strand 41 and protects the metal coating 30 from tarnishing thus making the strand 41 specially suited for decorative uses in textiles.

Figure 8:
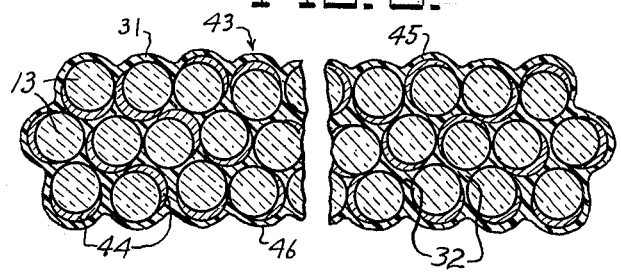
FIG. 8 is a greatly enlarged, fragmentary view in cross section of a modified form of the strand shown in FIG. 6 and made by a modified operation of the apparatus shown in FIGS. 1–4.

FIG. 8 shows a modified strand 43 made by a modified operation of the apparatus of FIGS. 1–4. The strand 43 has a multiplicity of glass filaments 13 which have continuous coatings 44 of metal about only portions of their peripheries. Each partial coating 44 is achieved by adjusting the guides 24 and 25 of the metal applicator 14 outwardly to immerse the strand 13 only partially in the globule 23. Otherwise, the operation of the apparatus of FIGS. 1–4 is exactly the same as the operation for making the strand 17. The partially coated filaments 13 act as convex lenses and gather light through their uncoated surfaces. The partial coatings 44 on the filaments 13 act as concave mirrors which reflect the gathered light in a concentrated manner. The strand 43 has two major reflective surfaces 45 and 46 which are partially formed by those outer surfaces of the partial metal coatings 44 that are oriented toward the major surfaces 45 and 46. Where the partial coatings are oriented so that the uncoated surfaces of the filaments 13 are faced toward the main surfaces 45 and 46, these filaments 13 and the partial coatings 44 form individual concave mirrors on the surfaces 45 and 46 which further enhance the luster and brilliancy of the strand 43. The partially coated filaments 13 also have a binder coating 31 in the form of a layer, as shown, or discontinuous droplets, and can have a thick plastic coating, such as the coating 42 of FIG. 7, applied by the operation of the apparatus of FIG. 5.

Figure 9:
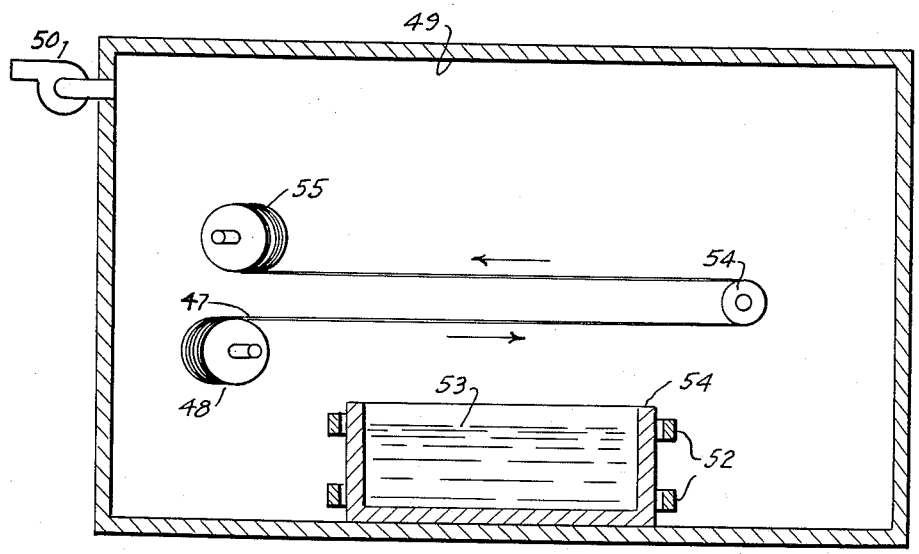
FIG. 9 is a simplified side view in cross section showing apparatus for completely coating strands made by another modified operation of the apparatus shown in FIGS. 1–4.

Rather than coating the individual filaments 13, the metal applicator 14 can be swung out of the way, if desired, and an uncoated, flattened strand made with the apparatus shown in FIGS. 1–4. The binder of the uncoated strand is hardened and the strand can then be coated by vacuum deposition with the apparatus shown in FIG. 9. An uncoated strand 47 is placed on a coil 48 in a chamber 49 which is evacuated by a suitable pump 50 to an absolute pressure of a few microns. The uncoated strand 47 is led over a crucible 51 heated by suitable means, such as electrical heating coils 52. The crucible 51 contains a pool 53 of metal which is vaporized by the heat from the coils 52 and is deposited on the strand 47. This is a "line of sight" operation which coats only those surfaces of the strand 47 directly exposed to the pool 53. Therefore, the strand 47 is led in a double pass over the pool 53, and each face of the flattened strand 47 is thereby exposed to the pool 53 so that the strand 47 is substantially completely coated. To accomplish this, the strand 47 is led over a pulley 54 and from there to a receiving spool 55 driven by a suitable motor (not shown). The flattened strand 47 is led in diagonal paths so that the upper path of the strand 47 is not directly over the lower path and the surfaces of the strand 47 in both paths are thus exposed to the pool 53. The strand 47 is thus completely coated with metal on both of its major faces. The strand 47 may be metal plated by other methods, such as gas plating as shown in the Nack patent, No. 2,749,255. If nickel carbonyl is employed in the gas plating process, a small amount of ammonia added to the nickel carbonyl will enhance the luster of the coated strand. The strand 47 can also be plated by a chemical deposition process according to the Whitehurst application, S.N. 630,379, filed December 24, 1956. The chemical deposition method can also include reacting chlorosilane containing silanic hydrogen with a base which functions as a reducing agent to precipitate silver or a similar reducible metal coating. For example, trichlorosilane can be dispersed in an aqueous solution to form a silane triol or polymer thereof. This mixture can then be coated on the strand 47 which is subsequently passed through a silver ammonium hydroxide bath to produce a silvered surface. This technique can also include organo silane compounds. The coating can also be applied by hot metal spraying devices, with or without auxiliary electrodes.

FIG. 10 shows a fragmentary enlarged view of a metal coated strand 56 coated according to the above discussed process. The strand 56 comprises the bare filaments 13 coated with the high integrity binder 31. A continuous metal coating 57 is applied over the entire outer surface of the strand 47 and provides two major reflective surfaces 58 and 59. The major surfaces 58 and 59 present large areas with which to intercept and reflect light rays in the same manner as the surfaces 33 and 34 or 45 and 46 of the strand 41 or 43 shown in FIGS. 6, 7, and 8. The strand 56 can be covered with a thick plastic coating applied by the apparatus of FIG. 5, if desired.

Rather than coating the entire strand 47 with metal, the strand 47 may be partially coated with metal according to the apparatus shown in FIG. 11. This apparatus is similar to that shown in FIG. 9 except that the pulley 54 and the receiving spool 55 are replaced by a single receiving spool 60. The strand 47 is led from a spool 61 in a single pass across the pool 51 of metal and wound on the receiving spool 60 which is driven by a motor (not shown). Only the lower surface of the strand 47 which is directly exposed to the pool 51 is thereby coated.

A coated strand 62 coated by the apparatus of FIG. 11 is shown in an enlarged, fragmentary view in FIG. 12 and comprises the strand 47 of uncoated glass filaments 13 held by the high integrity binder 31. A metal coating 63, as applied by the apparatus shown in FIG. 12, forms a major reflective surface 64. The surface 64 reflects light in the same manner as the reflective surfaces 33 and 34 of the strands 17 and 41 and the surfaces 45 and 46 of the strand 43. An inner surface 65 formed by the metal coating 63 produces a multiplicity of concave mirrors with the adjacent filaments 13. These concave mirrors are excellent reflectors of light passing through the upper, uncoated surface 66 of the strand 62. The strand 63 may also have a plastic coating 41 applied by the apparatus shown in FIG. 5.

The invention basically comprises a flattened glass fiber strand which has a metal coating around at least a portion of the outer peripheries of some of the outermost filaments.

The major surfaces of the flattened, metalized strands include surfaces that are either flat or slihgtly convex, as would be formed on an oblong cross section.

The above description and the accompanying drawings have been intended to illustrate and not limit the invention. The scope of the invention is determined only by the claims appended hereto.

We claim:

1. A metalized, continuous-filament strand comprising a multiplicity of continuous glass filaments arranged in compacted, substantially parallel relationship, a thin metal coating directly on a substantial portion of the periphery of each of a substantial number of said filaments and extending continuously substantially over the entire length thereof, each of said partly coated filaments also having a substantial uncoated portion around the periphery and along the entire length thereof, and a binder holding the filaments together in a generally flattened cross-sectional shape having a width many times its thickness, said metal coating being visible through said binder.

2. A metalized, continuous-filament strand comprising a multiplicity of continuous glass filaments arranged in compacted, substantially parallel relationship, a thin metal coating directly on a substantial portion of the periphery of each of a substantial number of said filaments and extending continuously substantially over the entire length thereof, each of said partly coated filaments also having a substantial uncoated portion around the periphery and over the entire length thereof, a binder holding the filaments together, said metal coating being visible through said binder, and a thick, light transmissive, plastic coating over the outer surface of the strand, said metal coating being visible through said plastic coating.

3. A metalized, continuous-filament strand comprising a multiplicity of continuous glass filaments arranged in compacted, substantially parallel relationship and bonded together by a binder, a thin metal coating around only those portions of the peripheries of the outermost filaments which are adjacent only a substantial portion of the periphery of the strand, said coating extending continuously substantially over the entire lengths thereof, the filaments adjacent the remaining substantial portion of the periphery of said strand being entirely uncoated around their peripheries and over their lengths, and a thick, light transmissive, plastic coating over the entire outer surface of the strand and over the entire length thereof, said metal coating being visible through said plastic coating.

References Cited in the file of this patent

UNITED STATES PATENTS

| 787,886 | Anet | Apr. 25, 1905 |
| 2,687,673 | Boone | Aug. 31, 1954 |
| 2,699,415 | Nachtman | Jan. 11, 1955 |
| 2,702,580 | Bateman | Feb. 22, 1955 |
| 2,719,804 | Carlson | Oct. 4, 1955 |
| 2,772,518 | Whitehurst et al. | Dec. 4, 1956 |
| 2,830,926 | Bailey | Apr. 15, 1958 |
| 2,867,552 | Homer | Jan. 6, 1959 |
| 2,906,656 | Case | Sept. 29, 1959 |

FOREIGN PATENTS

| 849,842 | France | Aug. 28, 1939 |
| 721,879 | Great Britain | Jan. 12, 1955 |